US006576686B1

(12) United States Patent
Delmé et al.

(10) Patent No.: US 6,576,686 B1
(45) Date of Patent: Jun. 10, 2003

(54) ROAD MARKING COMPOUND COMPRISING LINEAR TETRABLOCK COPOLYMERS

(75) Inventors: Roger Robert Delmé, Bellingen (BE); Jacques Bernard Lechat, Waterloo (BE); Chantal Mathilde Martin, Loupoigne (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/605,032

(22) Filed: Jun. 27, 2000

(51) Int. Cl.$^7$ .............................. F21V 7/22; C08L 53/02
(52) U.S. Cl. ................. 523/172; 524/274; 524/491; 525/98
(58) Field of Search ................ 523/172; 524/274, 524/491; 525/98

(56) References Cited

U.S. PATENT DOCUMENTS

| | | |
|---|---|---|
| 3,519,585 A | 7/1970 | Miller |
| 3,691,257 A | 9/1972 | Kendrick et al. |
| 3,932,328 A | 1/1976 | Korpman |
| 3,954,692 A | 5/1976 | Downey |
| 3,976,608 A | 8/1976 | Buckler et al. |
| 4,098,980 A | 7/1978 | Markle et al. |
| 4,136,137 A | 1/1979 | Hsieh et al. |
| 4,161,472 A | 7/1979 | Lehr ............................ 525/4 |
| 4,168,286 A | 9/1979 | Moczygemba ............. 525/314 |
| 4,288,480 A | 9/1981 | Grzywinski et al. |
| 4,431,777 A | 2/1984 | Tung et al. |
| 4,464,427 A | 8/1984 | Barlow |
| 4,748,051 A | 5/1988 | Songer et al. |
| 4,874,821 A | 10/1989 | Agostinis et al. |
| 4,939,208 A * | 7/1990 | Lanza et al. ................. 525/93 |
| 4,959,285 A | 9/1990 | Hoffmann |
| 5,143,968 A | 9/1992 | Diehl et al. |
| 5,213,439 A | 5/1993 | De Keyzer |
| 5,266,394 A | 11/1993 | Diehl et al. |
| 5,292,806 A | 3/1994 | Diehl et al. |
| 5,292,819 A | 3/1994 | Diehl et al. |
| 5,358,783 A | 10/1994 | Diehl et al. |
| 5,372,870 A | 12/1994 | Diehl et al. |
| 5,399,627 A | 3/1995 | Diehl et al. |
| 5,554,697 A | 9/1996 | Van Dijk et al. |
| 5,627,235 A | 5/1997 | Himes |
| 5,750,623 A | 5/1998 | Diehl et al. |

FOREIGN PATENT DOCUMENTS

| | | |
|---|---|---|
| EP | 0 499 326 A1 | 8/1992 |
| GB | 2 226 322 A | 6/1990 |
| GB | 2 289 681 A | 11/1995 |
| WO | WO 97/09385 | 3/1997 |
| WO | WO 00/56796 | 9/2000 |

* cited by examiner

*Primary Examiner*—Fred Teskin
(74) *Attorney, Agent, or Firm*—Charles E. Runyan; Paige Schmidt

(57) ABSTRACT

This invention relates generally to linear tetrablock copolymer compositions and their use in road marking applications. These tetrablock copolymers contain polystyrene, polyisoprene and polybutadiene components. Road marking compounds prepared from these copolymers further contain a hydrocarbon resin.

18 Claims, No Drawings

ROAD MARKING COMPOUND COMPRISING LINEAR TETRABLOCK COPOLYMERS

FIELD

This invention relates generally to linear tetrablock copolymer compositions and their use in road marking applications. These tetrablock copolymers contain polystyrene, polyisoprene and polybutadiene components. Road marking compounds prepared from these copolymers typically further contain hydrocarbon resin, fillers and glass beads.

BACKGROUND

Block copolymers are generally known in the art and have been used in a variety of applications. There are two basic and distinct types of block copolymers, linear and radial block copolymers.

Radial block copolymers contain branches of polymer blocks radiating from a central coupling agent. Such polymers are described in, for example, U.S. Pat. No. 5,399,627. This patent describes such polymers for use in pressure sensitive adhesive compositions. These radial block copolymers are comprised of polystyrene, polyisoprene and polybutadiene block segments.

Linear block copolymers do not have radiating branches; rather, the block components are arranged sequentially. For example, U.S. Pat. No. 5,750,623 describes linear styrene-isoprene-styrene and styrene-butadiene-styrene block copolymers useful in hot-melt adhesive formulations.

Linear block copolymers are also used to prepare compositions for road or pavement marking. Such compositions typically comprise copolymer elastomer and hydrocarbon resin components as well as color and reflective additives such as pigments and glass beads.

U.S. Pat. No. 5,213,439 is directed to pavement marking and describes a dry-blended powder composition containing a linear or radial tri-block copolymer containing two poly(vinylaromatic) blocks and a conjugated diene block. This copolymer must be ground to a powder prior to being combined with hydrocarbon resin and other additives. This grinding step is intended to replace the otherwise necessary step of melt blending thermoplastic rubbers such as these block copolymers with hydrocarbon resin using expensive high-shear stirring during a prolonged melt blending procedure.

We have discovered that certain linear tetrablock copolymer compositions are readily melted and mixed with hydrocarbon resin thus obviating the need for either powder grinding or high-shear stirring. Such copolymers thus have particular potential value in road marking applications in addition to the more typical adhesive applications.

SUMMARY

The present invention relates to a copolymer composition comprising a linear S-I-S-B tetrablock copolymer wherein the S component is polystyrene, the I component is polyisoprene and the B component is polybutadiene. In particular, in this S-I-S-B block copolymer, the S component is present in the amount of about 10 parts to about 90 parts per 100 parts by weight of the block copolymer, the I component is present in the amount of about 10 parts to about 90 parts per 100 parts by weight of the block copolymer, and the B component is present in the amount of about 10 parts to about 90 parts per 100 parts by weight of the block copolymer. The overall peak weight average molecular weight of the copolymer ranges from about 10,000 to about 1,000,000; and the copolymer contains less than 10% residual S-I diblock, less than 10% residual S-I-S triblock, and less than 10% residual S-B diblock.

This invention further relates to a road marking compound comprising a linear tetrablock copolymer having four blocks independently selected from polystyrene, polyisoprene and polybutadiene, and hydrocarbon resin.

More specifically, this road marking compound comprises: (a) a linear tetrablock copolymer represented by the formula S-I-S-B, S-I-S-I, S-B-S-B or S-B-S-I wherein S is a polystyrene component, I is a polyisoprene component and B is polybutadiene component; wherein each copolymer component is present in the amount of about 10 parts to about 90 parts per 100 parts by weight of the block copolymer; the overall peak weight average molecular weight of the copolymer ranges from about 10,000 to about 1,000,000; and the copolymer contains less than 10% residual S-I diblock and less than 10% residual S-I-S triblock; and (b) a substantially non-aromatic hydrocarbon resin.

DETAILED DESCRIPTION

The linear tetrablock copolymers of this invention are particularly useful in road marking compounds due to their quick melting capability and flowability. They can be easily melt mixed with hydrocarbon resins and other additives without the need for either powdering or high shear mixing. Each block may be either polystyrene ("S"), polybutadiene ("B") or polyisoprene ("I"). It will be recognized that since there must be four blocks, at least one of the blocks will be repeated. Preferably the tetrablock copolymer contains two S blocks, and two B blocks, two I blocks or one each of the B and I blocks combined with the two S blocks. Examples of such linear tetrablock copolymers are represented by the formulae: S-I-S-I, S-I-S-B, S-B-S-B and S-B-S-I.

Each block is present in the amount of about 10% by weight to about 90% by weight of the block copolymer based on the total weight of the block copolymer. Preferably, an S component makes up from about 5% to about 70% by weight of the tetrablock copolymer, more preferably from about 10% to about 60% by weight of the copolymer, even more preferably from about 10% to about 40% by weight of the copolymer and most preferably from about 10% to about 30% by weight of the copolymer.

The weight average molecular weight of the tetrablock copolymers of this invention varies widely depending on the exact make-up of the copolymer. Generally the overall peak weight average molecular weight ranges from about 10,000 to about 1,000,000, preferably from about 50,000 to about 500,000, more preferably from about 100,000 to about 300,000 and most preferably from about 100,000 to about 200,000.

Preferably, the linear tetrablock copolymers of this invention are "pure" in the sense that they contain no measurable residual triblock or diblock copolymer. However, the linear tetrablock copolymers of this invention may contain up to 1% by weight residual triblock and/or diblock copolymer.

For road marking application, these linear tetrablock copolymers are mixed with a hydrocarbon resin, preferably a substantially non-aromatic hydrocarbon resin, or with a rosin ester or a blend of both. Commercially available resins such as Escorez 1102RM (ExxonMobil Chemical) are suitable. Such resins preferably have a Ring and Ball softening point (ASTM D 28–96) of greater than 90, or from about 90°

C. to about 110° C., preferably from about 95° C. to about 105° C., and a melt viscosity at 160° C. (ETM-E-31) in the range of 100–10,000 mPa·s, or from about 500 to about 3000 mPa·s, preferably from about 1000 to about 2500 mPa·s. Such hydrocarbon resins are well known and commercially available; for example suitable hydrocarbon resins are those available under the trademarks "Escorez", "Hercules", "Quintone" and suitable rosin esters are available under the trademarks "Beviline", "Sylvatac". These non-aromatic hydrocarbon resins typically have a wax cloud point of 190° C. or below.

The relative amounts of tetrablock copolymer and hydrocarbon resin depends on the particular components selected. Typically, the block copolymer and hydrocarbon resin are present in a weight ratio of from about 0.5:99.5 to about 20:80, preferably from about 2:98 to about 15:85.

The road marking compounds of this invention may further contain additives such as pigments, glass beads, fillers, oils and viscosity modifiers. Titanium dioxide is a particularly useful pigment and mineral aggregates are particularly useful fillers.

The individual components of the road marking composition may be combined in any number of ways, but the tetrablock copolymers of this invention are uniquely suited to simple melt mixing with the hydrocarbon resin and any desired additive. The typical melt mixing temperature ranges from about 170° C. to about 210° C., preferably from about 180° C. to about 200° C.

The linear tetrablock copolymers of this invention may be prepared by any number of polymerization processes well known in the art. In particular, these block copolymers may be prepared in solution using anionic polymerization techniques. In general, when solution anionic techniques are used, these block copolymers are prepared by contacting the monomers to be polymerized simultaneously or sequentially with an organoalkali metal compound in a suitable solvent at a temperature within the range of from about 150° C. to about 300° C., preferably at a temperature within the range of from about 0° C. to about 100° C. Particularly effective anionic polymerization initiators are organolithium compounds having the general formula: $RLi_n$ wherein R is an aliphatic, cycloaliphatic, aromatic or alkyl-substituted aromatic hydrocarbon radical having from 1 to about 20 carbon atoms; and n is an integer of 1 to 4.

In general, any of the solvents known in the prior art to be useful in the preparation of such polymers may be used. Suitable solvents, then, include straight and branched chain hydrocarbons such as pentane, hexane, heptane, octane and the like, as well as alkyl-substituted derivatives thereof; cycloaliphatic hydrocarbons such as cylcopentane, cyclohexane, cycloheptane and the like as well as alkyl-substituted derivatives thereof, aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, tetrahydrofuran and the like.

The concentration of initiator can be regulated to control the molecular weight of the overall composition and of the polystyrene blocks. Generally, the initiator concentration is in the range of from about 0.25 to about 50 millimoles per 100 grams of monomer. The ratio of the initiator to the monomer determines the block size, i.e., the higher the ratio of initiator to monomer, the smaller the molecular weigh of the block.

Methods of controlling the molecular weights of the blocks and the overall polymer are quite well known. For instance, such methods are disclosed in U.S. Pat. No. 3,231,635 and in U.S. Pat. No. 3,149,182 which states that amount of monomer can be kept constant and different molecular weights can be achieved by varying the amount of the monomer (each patent fully incorporated herein by reference).

The first step of this process involves contacting the monoalkenyl arene and the organomonolithium compound (initiator) in the presence of an inert diluent therein forming a living polymer compound having the simplified structure A-Li. The monoalkenyl arene is preferably styrene.

Next, the living polymer in solution is contacted with a conjugated diene. Preferred dienes include butadiene and isoprene. The resulting living polymer has a simplified structure A-B-Li.

At this point, one of two processes can be employed to produce linear A-B-B-A tetrablock copolymer, i.e., (1) coupling process or (2) sequential process. In the coupling process, the living A-B-Li polymer is coupled with a multifunctional coupling agent.

There are a wide variety of coupling agents that can be employed. Any polyfunctional-coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds may contain two types of functional groups such as the combination of epoxy and aldehyde groups, isocyanate, halide groups and the like. Various other substituents which are inert in the treating reaction can be present such as hydrocarbon radicals as exemplified by the alkyl, cycloalkyl, aryl, arylalkyl and alkylaryl groups and the alkoxy, aryloxy, alkylthio, arylthio and tertiary amino groups. Many suitable types of these polyfunctional compounds have been described in U.S. Pat. Nos. 3,595,941; 3,468,972, 3,135,716; 3,078,254; and 3,594,452. When the coupling agent has two reactive sites, such as dibromoethane, the polymer will have the desired linear structure. When the coupling agent has three or more reactive sites, such as silicon tetrachloride, the polymer will have a radial or branched structure.

In the prior art, such as that exemplified by U.S. Pat. Nos. 3,595,941 and 3,468,972, the effort was always made to select the particular coupling agent or reaction conditions that resulted in the highest coupling efficiency. Coupling efficiency is defined as the number of molecules of coupled polymer divided by the number of molecules of coupled polymer plus the number of molecules of uncoupled polymer.

Coupling efficiency can be determined theoretically from the stoichiometric quantity of coupling agent required for complete coupling, or coupling efficiency can be determined by an analytical method such as gel permeation chromatography. Typical prior art coupling efficiency is from about 80% to almost 100% at temperatures of between about 65° C. to about 80° C., and sufficient pressure to maintain the reactants in a liquid phase.

After the coupling reaction, or when the desired coupling efficiency has been obtained, the product is neutralized such as by the addition of terminators, for example, water, alcohol or other reagents, for the purpose of removing the lithium radical forming the nucleus for the condensed polymer product. The product is then recovered such as by coagulation utilizing hot water or steam or both, or by employing a vacuum devolitilization/extrusion.

Alternatively, the living A-B-A-Li polymer can be reacted with a second and third addition of monomer, in the sequential polymerization process, to produce a linear tetrablock copolymer. After sequential polymerization, the product is then terminated such as by the addition of a protic terminating agent, fore example water, alcohol or hydrogen, for the purpose of removing the lithium radical forming the nucleus for the condensed polymer product. The product is then recovered such as by coagulation utilizing hot water or steam or both or by using vacuum devolitilization/extrusion. The polymers are not hydrogenated.

EXAMPLES

The following examples are intended to illustrate the melt behavior of tetrablock copolymers of this invention as compared to triblock and diblock copolymers. The samples were placed in an oven at 190° C. for 5 and 10 minutes. Faster melting and higher flowability indicated that the polymer will be easier to mix for road marking applications.

The molecular weights (MW) reported herein are the molecular weights corrected for the composition of the polymer. Molecular weights quoted are not polystyrene equivalent molecular weights, but actual molecular weights which have been corrected for the composition of the polymer. The molecular weight was determined by gel permeation chromatography (GPC) using the methods described previously in the literature: J. R. Runyan, et. al., J. Polym. Sci. 13. 2359 (1969). L. H. Tung, J. Appl. Polym. Sci. 24, 953–963 (1979).

Melt flow rate (MFR.) was determined according to ASTM D 1238, condition G.

Comparative Sample 1 is an S-I-S triblock copolymer, Vector 4111™ polymer, commercially available from Dexco Polymers.

Comparative Sample 2 is an S-I-S/S-I triblock/diblock copolymer mix, Vector™ 4113 polymer, commercially available from Dexco Polymers.

Comparative Sample 3 is an S-I-S/S-I triblock/diblock copolymer mix, Vector™ 4114 polymer, commercially available from Dexco Polymers.

Comparative Sample 4 is an S-I-S/S-I triblock/diblock copolymer mix, DPX 559, obtained from Dexco Polymers having 15% styrene, 55% SI and a Melt Flow Rate (condition G) of 44 g/10 min.

Comparative Sample 5 is an S-I-S triblock copolymer, DPX 562, commercially available from Dexco Polymers. DPX 562 is a linear SIS with 15% styrene and a Melt Flow Rate (condition G, 200 ° C., 5 kg) of 25 g/10 min.

Comparative Sample 6 is an S-I-S/S-I triblock/diblock copolymer mix, DPX 565 was obtained from Dexco Polymers. DPX 565 has the following properties. Molecular weight SIS: 176000 g/mol; Molecular weight SI: 83000 g/mol; Styrene content SIS: 16.1% (by weight); Styrene content SI: 16.1% (by weight); SI content: 54% of the polymer.

Invention Sample 7 is an S-I-S-I tetrablock copolymer in accordance with this invention made at Dexco Polymers by sequential polymerization has the following respective molecular weights, in g/mol :12400–60000–12400–70000 and styrene content of 16% (by weight).

Invention Sample 8 is an S-I-S-B tetrablock copolymer in accordance with this invention made at Dexco Polymers by sequential polymerization has the following respective molecular weights, in g/mol: 11000–57000–11000–40000 and styrene content of 19% (by weight).

Comparative Sample 9 is an S-I-S/S-I triblock/diblock copolymer mix, TR 1107, commercially available from Shell Oil Company.

Comparative Sample 10 is an S-I-S/S-I triblock/diblock copolymer mix, Kraton D 601 P, commercially available from Shell Oil Company.

Comparative Sample 11 is an S-I-S/S-I triblock/diblock copolymer mix, Kraton D 113 commercially available from Shell Oil Company.

Comparative Sample 12 is an S-I-S/S-I triblock/diblock copolymer mix, Quintac 3433, commercially available from Nippon Zeon.

TABLE 1

| Sample | Melt Rating @ 5 min.* | Melt Rating @ 10 min. | % Styrene | % Diblock | MFR | MW |
|---|---|---|---|---|---|---|
| Comp. 1 | 1 | 2 | 18 | 0 | 12 | 118000 |
| Comp 2 | 2 | 4 | 15 | 18 | 10 | 154000 |
| Comp 3 | 2 | 4 | 18 | 42 | 25 | 156000 |
| Comp 4 | 2 | 5 | 15 | 58 | 37 | 162000 |
| Comp 5 | 2 | 5 | 15 | 0 | 25 | n/a |
| Comp 6 | 1 | 2 | 16 | 54 | 12 | 176000 |
| Inv. 7 | 2 | 5 | 16 | 0 | n/a | 154000 |
| Inv. 8 | 4 | 5 | 19 | 0 | n/a | 126000 |
| Comp 9 | 2 | 4 | 15 | 17 | 9 | n/a |
| Comp 10 | 3 | 4 | 15 | 19 | 12 | n/a |
| Comp 11 | 2 | 4 | 16 | 56 | 16 | 168000 |
| Comp 12 | 2 | 4 | 17 | 55 | 12 | 172000 |

*1 = no change in sample; 2 = sample slightly melted; 3 = sample completely melted, no flow; 4 = sample completely melted, limited flow; 5 = sample completely melted good flow.

While the present invention has been described and illustrated by reference to particular embodiments, it will be appreciated by those of ordinary skill in the art, that the invention lends itself to many different variations not illustrated herein. For these reasons, then, reference should be made solely to the appended claims for purposes of determining the true scope of the present invention.

What is claimed is:

1. A road marking compound comprising
   a) a hydrocarbon resin, and
   b) a linear tetrablock copolymer having four blocks independently selected from polystyrene, polyisoprene and polybutadiene, wherein the tetreblock is represented by the formula S-I-S-B, S-I-S-I, S-B-S-B or S-B-S-I wherein S is polystyrene, I is polyisoprene and B is polybutadiene and wherein the compound is suitable for road marking use.

2. The road marking compound of claim 1 wherein each of the four blocks is present in the amount of about 10% by weight to about 90% by weight of the block copolymer based on the total weight of the block copolymer.

3. The road marking compound of claim 1 wherein the overall peak weight average molecular weight of the copolymer ranges from about 10,000 g/mole to about 1,000,000 g/mole.

4. The road marking compound of claim 1 wherein the copolymer contains less than 1% by weight residual diblock.

5. The road marking compound of claim 1 wherein the copolymer contains less than 1% by weight residual triblock.

6. The road marking compound of claim 1 wherein the copolymer contains less than 1% residual S-I diblock and less than 1% residual S-I-S triblock.

7. The road marking compound of claim 1 wherein the copolymer contains less than 1% residual S-I diblock or S-I-S triblock.

8. The road marking compound of claim 1 wherein the hydrocarbon resin is substantially non-aromatic.

9. The road marking compound of claim 1 wherein the hydrocarbon resin viscosity ranges from about 100 to 10000 mPa·s at 160° C. as measured by ETM-E-31.

10. The road marking compound of claim 1 wherein the hydrocarbon resin softening temperature is at least 90° C. as measured by ASTM D 28–96.

11. A road marking compound comprising:
(a) a linear tetrablock copolymer represented by the formula S-I-S-B, S-I-S-I, S-B-S-B or S-B-S-I wherein S is a polystyrene component, I is a polyisoprene component and B is polybutadiene component; wherein each copolymer component is present in the amount of about 10% by weight to about 90% by weight of the block copolymer based on the total weight of the block copolymer; the overall peak weight average molecular weight of the copolymer ranges from about 10,000 g/mole to about 1,000,000 g/mole; and the copolymer contains less than 10% residual S-I diblock and less than 10% residual S-I-S triblock; and
(b) a substantially non-aromatic hydrocarbon having a viscosity ranging from about 100 to 10000 mPa·s at 160° C. as measured by ETM-E-31, a wax cloud point of 190° C. max and a softening point that is at least 90° C.;
wherein the copolymer and hydrocarbon resin are present in a weight ratio of from 0.5:99.5 to 20:80 and wherein the compound is suitable for road marking use.

12. The road marking compound according to claim 1 comprising a styrenic block copolymer in which the styrenic block copolymer comprises a tetrablock copolymer having a styrene content of from 10–30 wt %.

13. A road marking compound according to claim 12 in which the styrene content is from 16–19 wt %.

14. A road marking compound according to claim 12 in which the block copolymer has a molecular weight from 50,000 g/mole to 500,000 g/mole.

15. A road marking compound according to claim 12 in which the styrenic blocks have a molecular weight from 4,000 g/mole to 35,000 g/mole.

16. A road marking compound according to claim 12 in which the styrenic blocks have a molecular weight from 6,000 g/mole to 20,000 g/mole.

17. A road marking compound according to claim 12 in which the unsaturated diene blocks have a molecular weight from 15,000 g/mole to 200,000 g/mole.

18. A road marking compound according to claim 12 in which the unsaturated diene blocks have a molecular weight from 15,000 g/mole to 150,000 g/mole.

* * * * *